(12) United States Patent
Marshall et al.

(10) Patent No.: US 6,181,032 B1
(45) Date of Patent: Jan. 30, 2001

(54) RELEASABLY CONNECTING POWER PACKS TO ELECTRICAL APPLIANCES

(75) Inventors: James D. Marshall, Mallorytown; Michael A. Milligan, Seeleys Bay, both of (CA); Kevin Stones, Bishop Auckland (GB)

(73) Assignee: Black & Decker Inc., Newark, DE (US)

( * ) Notice: Under 35 U.S.C. 154(b), the term of this patent shall be extended for 0 days.

(21) Appl. No.: 09/353,451

(22) Filed: Jul. 14, 1999

(51) Int. Cl.⁷ ................................. H02J 7/00; H01H 9/28
(52) U.S. Cl. ...................... 307/150; 320/113; 200/43.17; 200/321
(58) Field of Search ............................ 307/150; 320/113; 310/50; 439/287, 481; 200/332.2, 43.17, 321

(56) References Cited

U.S. PATENT DOCUMENTS

| | | |
|---|---|---|
| 2,186,601 | 1/1940 | Borkenstein . |
| 3,212,938 | 10/1965 | Neuhardt et al. . |
| 3,461,556 | 8/1969 | Chambers . |
| 3,759,020 | 9/1973 | Simmons . |
| 3,843,224 * | 10/1974 | Greke, Jr. et al. ................. 439/481 |
| 3,952,239 | 4/1976 | Owings et al. . |
| 3,959,879 | 6/1976 | Sellers . |
| 3,973,179 | 8/1976 | Weber et al. . |
| 4,040,698 | 8/1977 | Ortiz . |
| 4,050,003 | 9/1977 | Owings et al. . |
| 4,237,610 | 12/1980 | Bradus et al. . |
| 4,280,026 | 7/1981 | Alessio . |
| 4,309,067 | 1/1982 | Riley, Jr. . |
| 4,342,931 | 8/1982 | Grossmann et al. . |
| 4,399,201 | 8/1983 | Nagahara . |
| 4,421,964 * | 12/1983 | Buchtel ............................. 200/332.2 |
| 4,538,871 | 9/1985 | Li . |
| 4,728,876 | 3/1988 | Mongeon et al. . |
| 4,987,681 | 1/1991 | Sepke . |
| 5,170,561 | 12/1992 | Sepke . |
| 5,181,369 | 1/1993 | Everts . |
| 5,208,525 * | 5/1993 | Lopic et al. ............................. 320/2 |
| 5,213,913 | 5/1993 | Anthony, III et al. . |
| 5,259,769 | 11/1993 | Cruise et al. . |
| 5,265,341 | 11/1993 | Kikuchi . |
| 5,638,945 | 6/1997 | Fukinuki et al. . |
| 5,685,080 | 11/1997 | Amano et al. . |

* cited by examiner

Primary Examiner—Stephen W. Jackson
Assistant Examiner—Rios Roberto
(74) Attorney, Agent, or Firm—Fish & Richardson P.C., P.A.

(57) ABSTRACT

An improved interface for releasably connecting a power control module or battery pack to an electrical appliance or tool. The power control module includes a power control trigger and provides electrical power to a motor of the appliance. The power control switch is located on the appliance, and is actuated by a portion of the trigger extending through the interface. The interface includes a pair of dovetail connections with interlocking flanges, requiring a two-motion procedure for assembly and disassembly. A latch release assembly interacts with the trigger to avoid powering the motor during assembly, and to prevent disassembly with the trigger pulled.

39 Claims, 7 Drawing Sheets

RELEASABLY CONNECTING POWER PACKS TO ELECTRICAL APPLIANCES

TECHNICAL FIELD

This invention relates generally to portable electrical power tools, and specifically to interfaces for releasably connecting power control modules to electrical appliances, and to methods of connecting such interfaces.

BACKGROUND OF THE INVENTION

Electrical power tools are in widespread use, and with improving battery technology, cordless tools are becoming lighter, more efficient and more common. Any given user may have several such tools for performing different functions around the home, garden or job site. There have been many attempts at designing such tools to be modular, in order to avoid unnecessary duplication of hardware common to all of a user's power tools.

The design of the interface between common and specific modules is critical to the safety and reliability of such a modular system. When transferring electrical power or signals across such an interface, care should be taken to ensure reliable electrical contact. In addition, the modules should lock together in a manner which avoids inadvertent separation.

Modular cordless systems, in which a common module contains a storage battery and task-specific modules contain electric motors, require electrical power to be transferred across the module interface. It is important in many applications that motors of such tools not be inadvertently energized during assembly and disassembly of the common module, or battery pack, with any given task-specific module, or tool chassis.

SUMMARY OF THE INVENTION

The invention features an improved interface for releasably connecting an electrical appliance and a power control module having a power control trigger and being adapted to provide electrical power to a motor of the appliance.

According to one aspect of the invention, the interface (which defines an interface plane between the appliance and power control module) includes a flange extending from one of the module and appliance and arranged to be inserted through an aperture in the other of the module and appliance as the module and appliance are moved toward the interface plane in a disengaged position. The other of the module and appliance defines a corresponding slot to receive the flange as the module and appliance are subsequently slid across one another along the interface plane to an engaged position. The interface also includes a latch extending from one of the module and appliance to engage a detent of the other of the module and appliance, to releasably retain the module and appliance in their engaged position. A first electrical contact, attached to one of the module and appliance, is arranged to engage a second electrical contact attached to the other of the module and appliance with the module and appliance in their engaged position, to transfer electrical power from the module to the appliance.

In some embodiments, the interface also includes an actuator extending from the power control module and operable by the trigger. The actuator is arranged to engage an electrical switch mechanism of the appliance to control a flow of electrical current from the power control module to the appliance.

The actuator, in some instances, is a lever extending from the power control module and adapted to move in a direction along the interface plane to depress the electrical switch mechanism as the trigger is actuated.

In some cases, one of the module and appliance also includes a latch release mechanism exposed for manual operation to and adapted to release the latch to enable the module and appliance to be moved to their disengaged position. Preferably, the latch release mechanism is constructed and arranged to physically block operation of the actuator while the latch release mechanism is operated. It is also preferred that the actuator be constructed and arranged to physically block operation of the latch release mechanism while the trigger is actuated.

The latch release mechanism may include a pair of depressible buttons, which may be connected by a resilient member, disposed on opposite sides of one of the module and appliance, for example.

In some preferred configurations, the interface is constructed and arranged to allow moving the module and appliance to their engaged position without operating the latch release mechanism.

In some cases, the actuator is constructed to engage and retain the latch release mechanism in a non-latched position when the trigger is pulled while the latch release mechanism is in its non-latched position. For example, the actuator may define an undercut engageable by a hooked protrusions extending from opposing ears of the latch release mechanism.

In a presently preferred embodiment, the latch and latch release mechanism are components of the appliance.

In some embodiments, one of the module and appliance has two flanges extending in opposite directions generally parallel to the interface plane and perpendicular to the slot. The other of the module and appliance defines two slots, arranged in opposition, for receiving the flanges with the module and appliance in their engaged position.

The one of the module and appliance having the two flanges also has, in some configurations, an auxiliary flange spaced apart from, and parallel to, the two flanges. The other of the module and appliance further defines a third slot, of different dimensions than the other two slots, for receiving the auxiliary flange as the module and appliance are moved to their engaged position.

Preferably, the interface is constructed and arranged to permit the flange to be inserted through the aperture with the module and appliance in only one orientation.

In some preferred interfaces, the first and second electrical contacts extend along the interface plane such that the contacts slide across one another as the module and appliance are moved toward their engaged position.

According to a second aspect of the invention, the interface includes a wide dovetail portion extending from the appliance and arranged to be inserted, through an aperture in the power module, toward the interface plane with the module and appliance in a disengaged position. The power module defines a first slot to receive the wide dovetail portion of the appliance as the power module and appliance are subsequently slid across one another along the interface plane to an engaged position. The interface also includes an actuator extending from the power control module and operable by the trigger. The actuator is arranged to engage an electrical switch mechanism of the appliance to control a flow of electrical current from the power control module to the appliance. Furthermore, the interface includes a latch extending from the appliance to engage a detent of the power module, to releasably retain the module and appliance in their engaged position. The latch is operable by a latch release mechanism exposed for manual operation on the appliance. The interface also includes an electrical contact attached to the power module and arranged to engage an electrical contact of the appliance with the module and appliance in their engaged position, to transfer electrical power from the module to the appliance.

In some cases, the power module also defines a second slot, spaced apart from the first slot along the interface plane and adapted to receive a narrow dovetail portion extending from the appliance, as the module and appliance are slid along the interface plane toward their engaged position. Preferably, the wide dovetail portion is between about 75 and 85 millimeters in width, as measured across the interface plane, and the narrow dovetail portion is between about 55 and 65 millimeters in width, as measured across the interface plane.

According to a third aspect of the invention, the interface includes flanges on each of the power control module and appliance, a latch pawl, electrical contacts on each of the power control module and appliance, an actuator, and a latch release. The flanges are arranged to overlap as the power module is slid along the interface plane, to an engaged position on the appliance. The latch pawl extends from the appliance to engage a detent of the power control module, to releasably retain the module in its engaged position. The contacts are arranged for electrical engagement when the module is in the engaged position, to transfer electrical power from the module to the appliance, and the actuator extends from the power control module to activate an electrical switch of the appliance when a trigger of the power control module is actuated. The latch release mechanism is exposed for manual operation to retract the latch pawl and physically block activation of the electrical switch by the actuator during power control module installation and removal.

According to a fourth aspect of the invention, a power control module, for providing power to a portable electrical appliance, includes a housing having a mounting face configured for releasable attachment to a corresponding face of the electrical appliance. The mounting face defines an aperture for receiving a flange of the appliance face as the housing and appliance faces are moved toward one another in a disengaged position, and a slot contiguous with and extending from the aperture along the mounting face, for receiving the flange of the appliance face as the housing and appliance faces are slid across one another to an engaged position. An electrical contact of the power control module extends from the housing and is exposed to engage a mating contact of the appliance as the housing and appliance are moved to their engaged position. The contact is adapted to transfer electrical power from the power control module to the appliance. A trigger is movably attached to the housing and exposed to be manipulated by an operator to control the appliance.

In some embodiments the power control module also includes a battery contained within the housing (which may define a graspable handle, for instance) and electrically connected to the electrical contact.

In some cases, the power control module is adapted to receive electrical power from an external power source while attached to the appliance. The power control module may include, for instance, an electrical cord for plugging the module into an AC electrical outlet.

In some cases, the power control module has an external contact for connection to an external DC power source.

Various embodiments of the power control module have one or more of the features discussed above with respect to the interface of the invention.

According to a fifth aspect of the invention, a portable electrical appliance is configured to accept, in a releasable attachment, the above-described power control module. The portable electrical appliance, adapted to be powered by the removable power module, includes an electrical motor arranged to do useful work and has a power module mounting face with two sets of outwardly extending flanges and an electrical contact for receiving electrical power from the power module for driving the motor. The two sets of flanges are spaced apart, in a direction parallel to the slots, for receiving a mating set of flanges of the power module between them in a first assembly motion. The two sets of flanges overhang associated slots adapted to receive mating flanges of the power module during a second assembly motion, generally perpendicular to the first assembly motion, to retain the power module on the appliance.

In some cases, one set of the flanges extends over a greater width, measured in a direction perpendicular to the slots, than the other set of flanges. In a presently preferred embodiment, the wider set of flanges extends over a width of about 82 millimeters.

The appliance also includes, in some instances, a latch extending outwardly into one of the overhung slots and adapted to engage a detent of the power module to releasably retain the module and appliance in an engaged position.

According to a sixth aspect of the invention, an improved portable electrical power tool is provided. The tool includes an appliance and a removable power module. The appliance has an electrical motor arranged to do useful work, and a housing with a mounting face having an extending flange and an electrical contact for receiving electrical power. The removable power module has a housing with a mounting face configured for releasable attachment to the mounting face of the appliance housing. The mounting face of the power module housing defines an aperture for receiving the flange of the appliance mounting face as the mounting faces are moved toward one another in a disengaged position. The mounting face of the power module also defines a slot, contiguous with and extending from the aperture along the power module mounting face, for receiving the flange of the appliance mounting face as the mounting faces are slid across one another to an engaged position. The power module also includes an electrical contact and a trigger. The electrical contact extends from the power module housing and is exposed to engage the contact of the appliance as the power module is moved to its engaged position. The contact is adapted to transfer electrical power from the power control module to the appliance. The trigger is movably attached to the power module housing and is exposed to be manipulated by an operator to control the appliance.

In some embodiments, the removable power module is a battery pack containing at least one electrical storage battery. The battery may be adapted to be recharged through the electrical contact extending from the power module housing, and may be adapted to be recharged within the battery pack while the battery pack is installed on the appliance.

In some preferred embodiments, the power tool is an outdoor home gardening tool, such as a trimmer, blower, cultivator, pruning saw, hedge trimmer or the like. The power tool may also be a woodworking tool, such as a circular saw or sander, or other useful device, such as a light or a vacuum-cleaner, for example.

According to a seventh aspect of the invention, a method of releasably installing a removable power control module on an electrical appliance is provided. The method includes the steps of (1) bringing the mounting faces of any of the above-described appliances and power modules together in face-to-face relation in a disengaged position, while inserting the flange of the appliance housing into the aperture of the power module housing mounting face; and (2) while holding the latch release mechanism in an actuated state, sliding the power module and appliance mounting faces across one another in a predetermined direction to an engaged position, the flange of the power module mounting face being received within the slot of the appliance housing mounting face and the electrical contact of the power module engaging the contact of the appliance housing.

The invention can provide a safe, reliable interface between power-providing and power-consuming modules of a power tool system. Undesirable power transfer during assembly and disassembly can be avoided, and the two-motion procedure required to expose the contacts and separate the interface can help to protect from accidental release as well as requiring a desirably small amount of overall travel for engagement. By locating the trigger in a handle on the power pack, a comfortable weight distribution can be established. By locating the power switch within the power-consuming module, the switch may be efficiently matched to the power requirements of the associated motor and be selected to provide a mode of control appropriate for the given tool. Furthermore, inadvertent energization of the motor by voltage accidentally applied to the exposed contacts of the power-consumption module can be avoided. In addition, the number of electrical contact points at the interface can be kept to only two, through which the battery may be directly charged without the need for actuating any switches on the power module.

Other advantages and embodiments will be apparent from the following description, the drawings and the claims.

DESCRIPTION OF EMBODIMENTS

Figure 1:
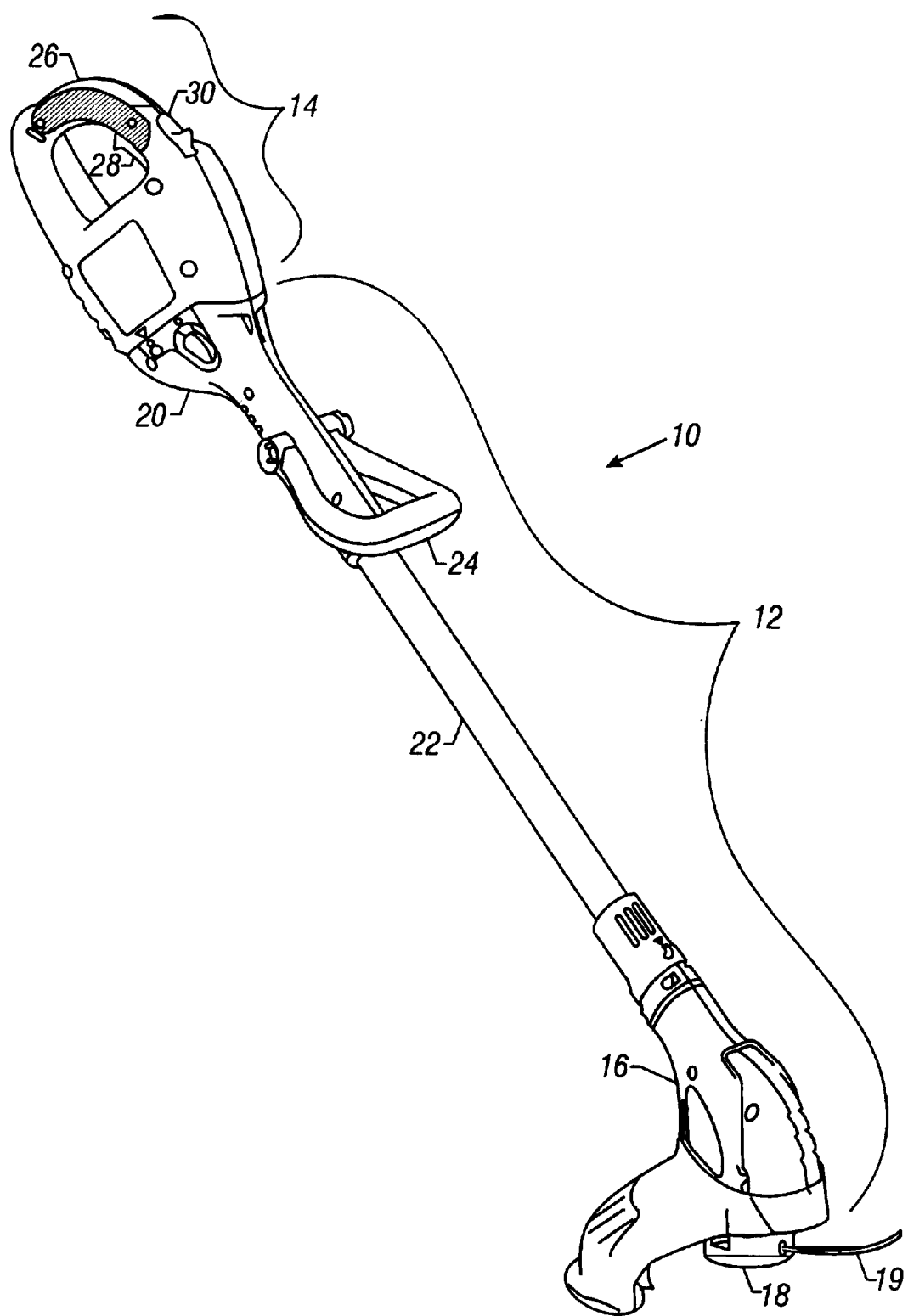
FIG. 1 is a perspective view of a power trimmer.

Referring to FIG. 1, power string trimmer 10 consists of a motorized chassis 12 and a removable battery pack 14. Chassis 12 includes a head 16 with an internal electric motor (not shown) arranged to drive a partially shielded rotary string hub 18 with an extending string element 19 for cutting weeds and grasses. Head 16 is connected to an upper chassis housing 20 by a tube 22 through which wires conduct electrical power from battery pack 14 to the motor of head 16. The trimmer is held by both hands in use, with a forward stirrup grip 24 and a rear handle 26 on the battery pack. A forefinger-operable trigger 28 in handle 26 controls the flow of power from the battery pack to the trimmer motor, and a trigger lock 30 automatically locks the trigger in its "off" position until actuated, preventing inadvertent trigger operation.

Figure 2A:
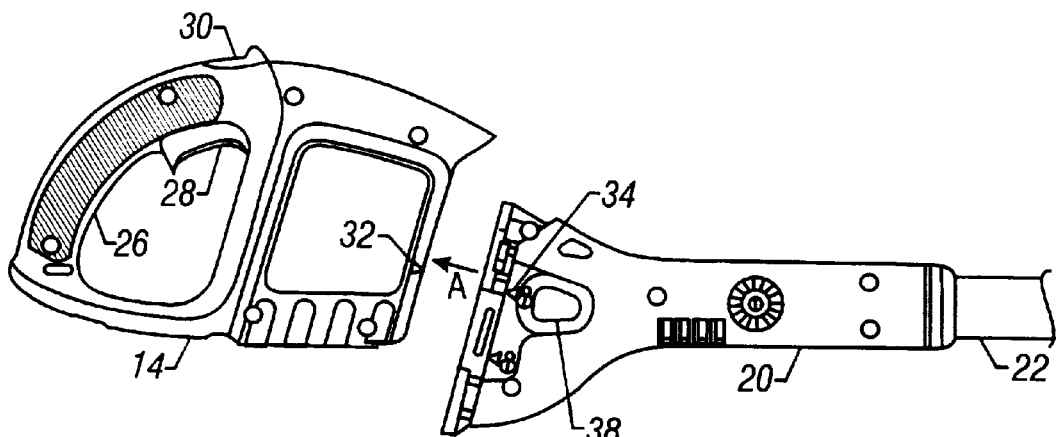
FIGS. 2A–2C sequentially illustrate the installation of the battery pack onto the trimmer of FIG. 1.
Figure 2B:
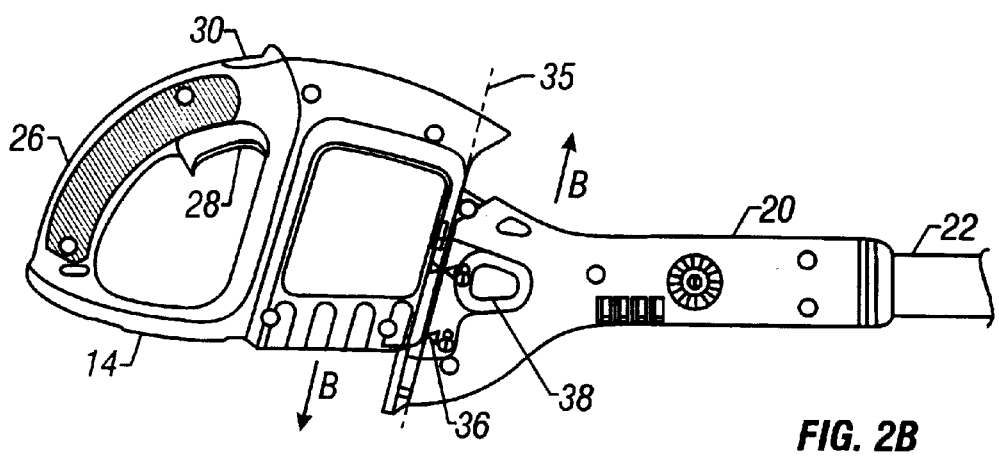
Figure 2C:
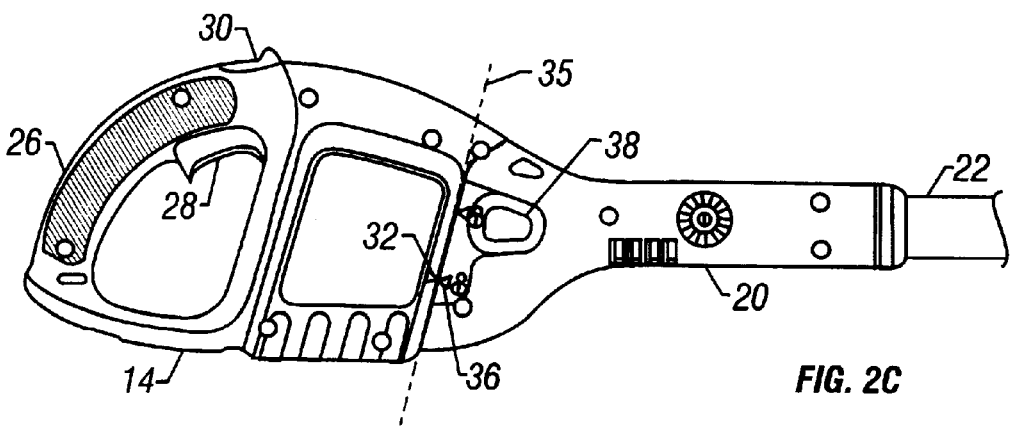
Figure 3A:
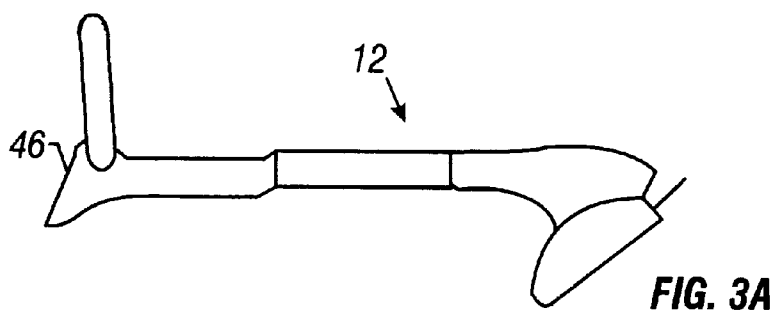
FIGS. 3A–3D illustrate other power tools adapted to be powered by the power pack of FIG. 2.
Figure 3B:
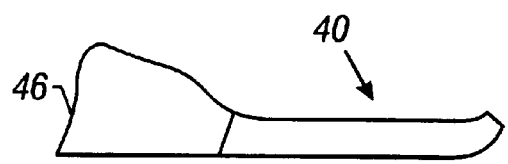
Figure 3C:
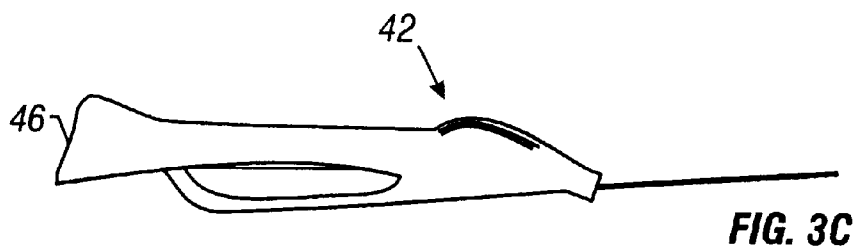
Figure 3D:
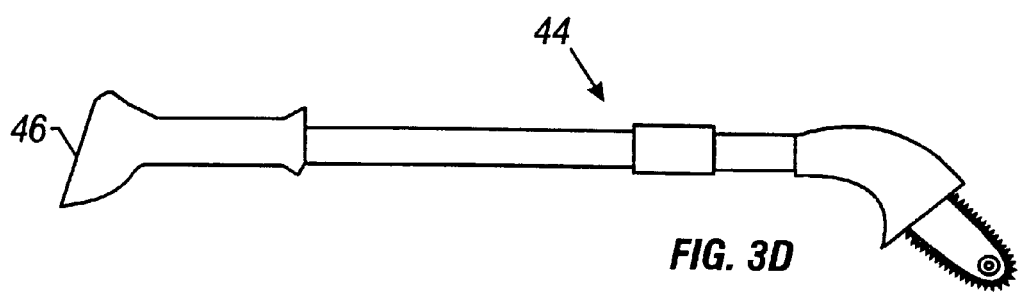

Referring to FIGS. 2A–2C, battery pack 14 is readily attached to the upper chassis housing 20 of the trimmer in a two-motion sequence. First, as shown in FIG. 2A, the mounting faces of the battery pack 14 and upper chassis housing 20 are brought together in a motion perpendicular to the faces (indicated by arrow "A") with the alignment indicator 32 of the battery pack housing aligned with an "unlocked" indicator 34 of the upper chassis housing. At the end of this first motion, the battery pack 14 and upper chassis housing 20 are positioned as shown in FIG. 2B. Next, the battery pack and upper chassis housing mounting faces are slid across one another along their interface plane 35, as indicated by arrows "B" in FIG. 2B, until alignment indicator 32 is aligned with a "locked" indicator 36 of the upper chassis housing 20, and the mounting latch (discussed below with respect to FIGS. 6–8) snaps into place to securely retain the battery pack in place upon the upper chassis housing. Indicators 32, 34 and 36 are integrally molded as features of the plastic housings of the battery pack and upper chassis, and feature appropriate icons.

To remove battery pack 14 from upper chassis housing 20, the sequence of FIGS. 2A–2C is reversed. First, the user depresses a pair of latch release buttons 38 located on either side of the upper chassis housing (only one is shown in these views). Depressing the latch release buttons releases a battery pack mounting latch (not shown) and enables the user to slide the two mounting faces across each other to the position shown in FIG. 2B, where they may be separated perpendicularly as shown in FIG. 2A. With the battery pack mounted as shown in FIG. 2C, the internal configuration of the trigger mechanism and the mounting latch, as discussed in more detail below, disallows depressing latch release buttons 38 while trigger 28 is pulled, and disallows pulling the trigger while the latch release buttons are depressed. Thus, the trigger and latch cooperate to prevent contact arcing and inadvertent energizing of the trimmer motor during battery pack mounting and detachment, as well as accidental unlatching of the battery pack 14 from the chassis 12 (FIG. 1) while the power consuming device is operating.

Cordless battery pack 14 may be employed to power a large variety of power tools and equipment. For example, FIGS. 3A–3D illustrate, in order, string trimmer chassis 12, a leaf blower 40, a long reach hedge trimmer 42, and a pruning saw 44. Each tool is provided with a similar battery pack mounting face 46 adapted to receive the battery pack. Other portable cordless electrical tools, such as hand-held vacuum cleaners, paint sprayers, cultivators, rotating brushes, high-power flashlights and the like, are also envisioned. Thus, one or two battery packs may be employed to sequentially operate an entire suite of tools and appliances.

Figure 4:
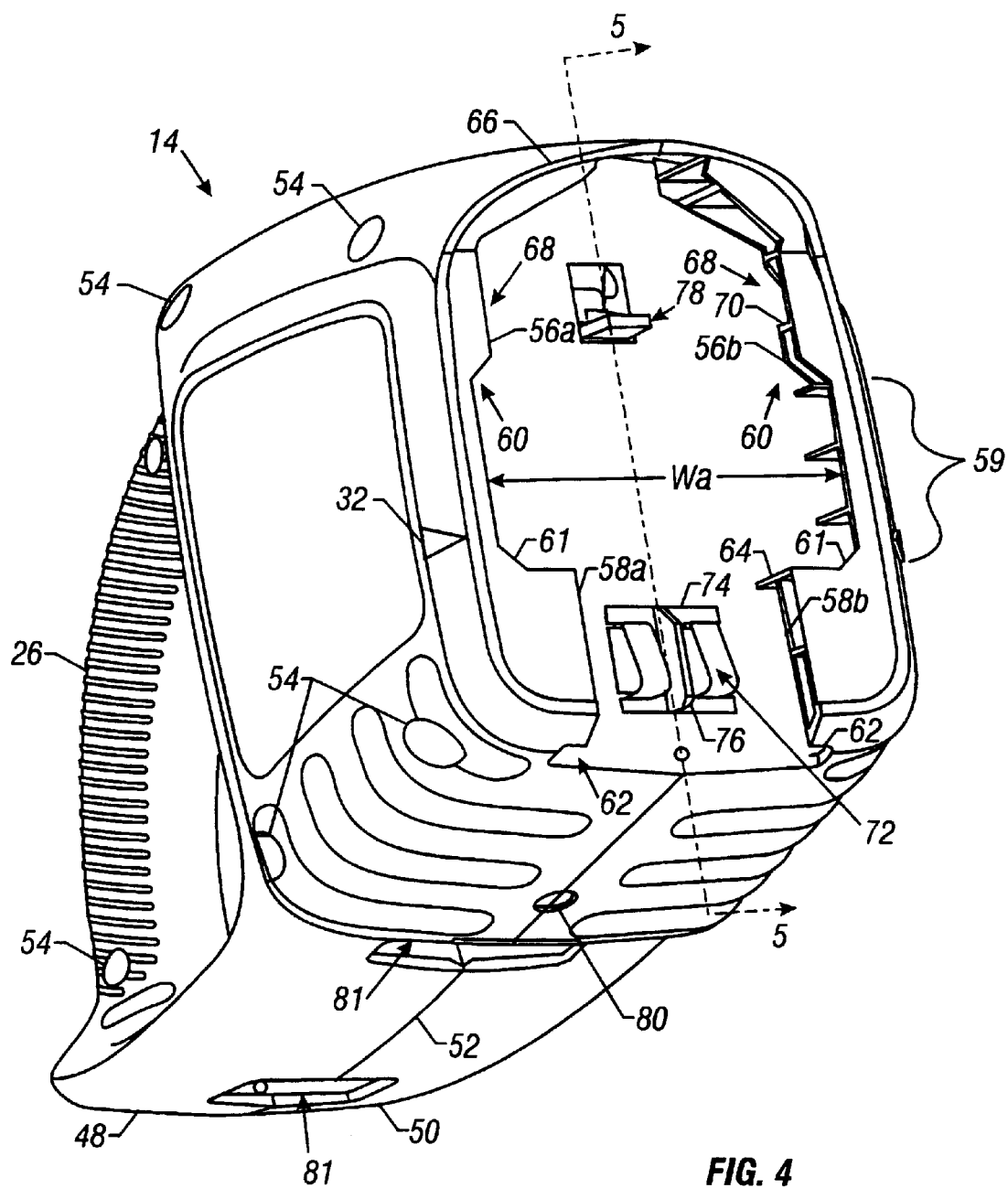
FIG. 4 is a perspective view of the power pack, showing its mounting face.

The battery pack mounting configuration will now be more fully discussed. As shown in FIG. 4, battery pack 14 has left and right housing halves 48 and 50 of injection molded ABS plastic, joined along line 52 and held together by a series of threaded fasteners accessed through sockets 54. Together, housing halves 48 and 50 form a generally flat mounting face (the near end of the battery pack, as shown in FIG. 4) for securing the battery pack to any one of the tools discussed above. At the mounting face, the housing halves form two sets of opposed, inwardly facing flanges 56*a* and 56*b*, and 58*a* and 58*b*, which define undercuts for receiving outwardly facing flanges of the mounting face of the mating tool. Adjacent flanges 56*a* and 56*b*, the extensions of the two housing halves are spaced apart to define a wide aperture 59 of width "$W_a$" of about 84 millimeters (mm), with the inner edges of flanges 56*a* and 56*b* separated by only about 72 mm. Slots 60 beneath flanges 56*a* and 56*b* receive cooperating flanges of the mating tool, which are first inserted through aperture 59 during the motion illustrated in FIG. 2A. During battery pack disengagement, overhanging chamfers 61 at the lower edge of aperture 59 catch the mating tool flanges when the two mounting faces are slid apart beyond the aligned position shown in FIG. 2B. To clear chamfers 61, the tool housing must be first moved slightly back toward its locked position to align the tool flanges with aperture 59 and completely separate the battery pack from the tool.

Flanges 58*a* and 58*b* are separated by only about 50 mm, and overhang slots 62 which receive a corresponding set of outwardly facing flanges of the mating tool. The difference in separation widths between the two sets of opposing flanges helps to key the battery pack mounting to disallow mounting in all but the intended orientation. At the inner end of slots 62, a molded wall 64 provides, together with the curvature of the upper end 66 of the mounting face, a firm stop for the motion illustrated in FIG. 2B.

As shown, all of the mounting flanges are molded with double wall construction for rigidity and strength. The inner walls of flanges 56*a* and 56*b* are relieved to form covered pockets 68 for receiving the pawls of the mounting latch discussed below. With the battery pack mounted, the pawls of the mounting latch of the tool engage perpendicular edges 70 of pockets 68 to lock the battery pack in place.

Extending from the mounting face between flanges 58*a* and 58*b* are a pair of phosphor bronze electrical contacts 72 in electrical communication with a rechargeable storage battery (not shown) within the battery pack. Contacts are secured to a terminal board 74 secured to the battery pack housing and forming a central rib 76 extending between the contacts to help avoid shorting.

Also extending from the mounting face is a switch actuator 78 which, with the battery pack mounted, is arranged to operate a power switch of the tool (not shown) when moved parallel to the mounting face by depressing battery pack trigger 28 (FIG. 1).

A charging port 80 in the underside of the battery pack accepts a direct current (DC) power plug for recharging the battery when not in use, and blind pockets 81 molded into the underside of the housing are for locating the battery pack on an optional charging saddle or for hanging the battery pack against a vertical surface.

Figure 5:
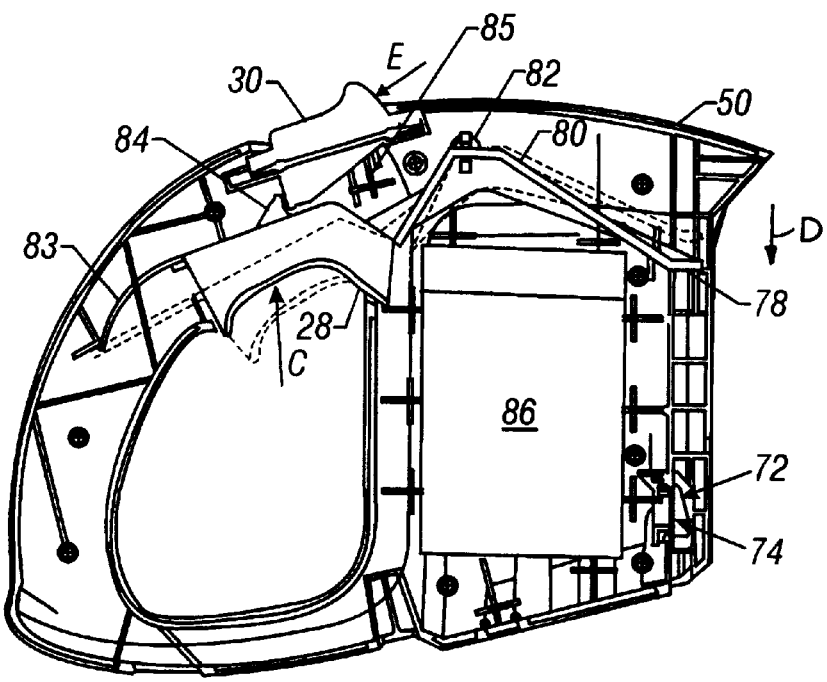
FIG. 5 is a cross-sectional view, taken along line 5—5 of FIG. 4.

Referring to FIG. 5, switch actuator 78 and trigger 28 are portions of a single, unitarily molded acetal polymer lever 80 which is rotatably secured to the battery pack housing at a pivot 82. Thus the trigger linkage "reaches through" the interface plane, into the tool, to operate a switch located within the tool. This enables the switch itself to be sized appropriately for the power requirements of the tool motor, which may vary between different tools. When trigger 28 is pulled in the direction of arrow "C" (as shown in solid outline), actuator 78 is moved downward, in the direction of arrow "D", and an integrally molded finger 83 extending rearward from trigger 28 is deflected against a protrusion of the housing. When the trigger is released, the spring force of the deflected finger 83 biases the actuator upward and returns the trigger to the released position shown in dashed outline. A projection 84 extends from the upper surface of trigger 28 to interact with trigger lock 30, which is biased rearward by a molded cantilever finger 85 of lock 30 which is deflected against a fixed housing projection with lock 30 in a forward, trigger-releasing position as shown. With the lock "off" (as shown), the trigger is readily depressed. When the trigger is subsequently released, the spring force of cantilever finger 85 moves the lock rearward (in the direction of arrow "E"), where the underside of the lock interferes with projection 84 and prevents pulling of the trigger until lock 30 is again released by holding the lock forward while pulling trigger 28.

Enclosed within the battery pack housing is a storage battery 86 with sufficient capacity to operate any of the associated tools over an extended period of time. In one presently preferred embodiment, battery 86 is of the sealed lead acid (SLA) type, but nickel-cadmium (NiCAD), nickel-metal hydride (NiMH) or any other type of rechargeable battery may be employed. Preferably, battery 86 has an operative capacity of at least about 5 amp-hours. Battery 86, in this embodiment, operates at a nominal DC voltage of about 12 volts and a normal operating current for powering the string trimmer is about 8 to 12 amps continuous.

Figure 6:
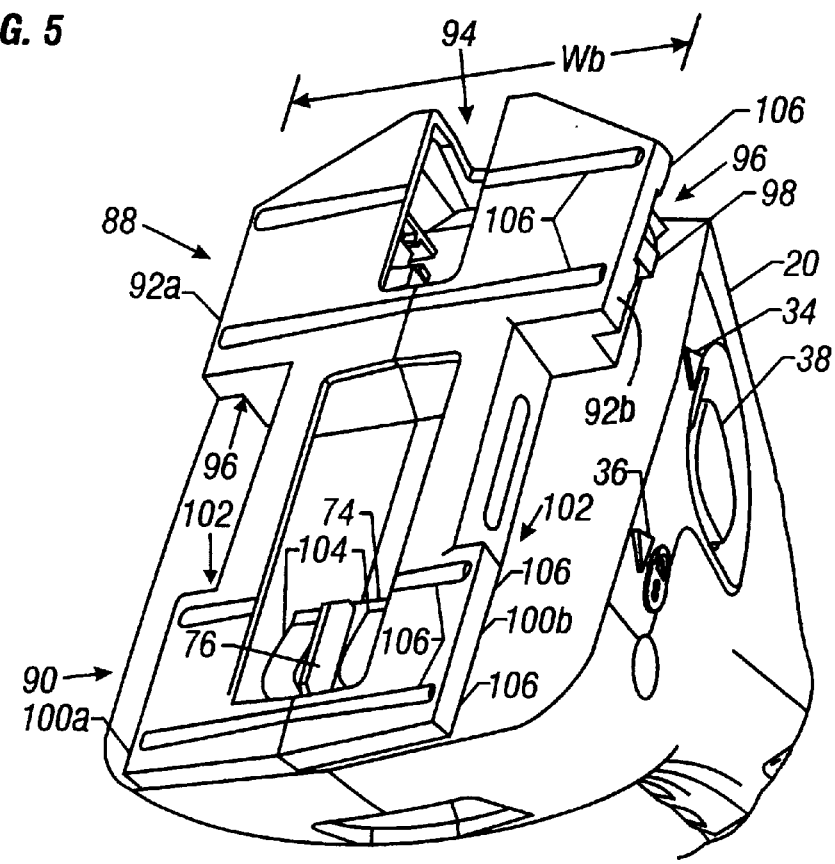
FIG. 6 is a perspective view of the battery pack mounting face of the trimmer chassis.

Referring to FIG. 6, the mounting face of the upper tool housing 20 of the trimmer chassis has both wide and narrow dovetail portions 88 and 90 that mate with the flanges of the mounting face of the battery pack housing. Wide dovetail portion 88 has outwardly extending flanges 92*a* and 92*b* that extend over a width "$W_b$" of about 82 mm and defines a channel 94 for receiving the switch actuator of the battery pack. A switch (not shown) in the base of the channel opens and closes an electrical circuit through the tool motor (also not shown). Flanges 92*a* and 92*b* overhang slots 96 along the sides of the wide dovetail portion into each of which a moveable latch pawl 98 extends. Narrow dovetail portion 90 has outwardly extending flanges 100*a* and 100*b* that extend over an overall width of about 48 mm and overhang slots 102 along the sides of the narrow dovetail portion.

Enclosed within narrow dovetail portion 90 are a pair of electrical contacts 104 in electrical communication with the tool motor (not shown) through the tool power switch (also not shown). Contacts 104, similar in construction to contacts 72 of the battery pack (FIG. 4) are mounted to a terminal board 74 with a central rib 76. The outer surfaces of contacts 104 (and contacts 72 of FIG. 4) are all sloped with respect to the interface plane between the battery pack and tool housings. During engagement, the contacts are arranged to slide over one another, helping to wipe excess oxidation and other non-conductive material from their contact surfaces. The sloped design also helps to ensure that electrical contact is made only along a very narrow band (so-called "line contact") at the outer portions of the contacts.

The wide and narrow dovetail portions of the mounting face of the trimmer housing are also provided with tapered ribs 106 on both inner and outer faces of flanges 92*a*, 92*b*, 100*a* and 100*b*. Ribs 106 help to minimize tolerance play between the battery pack and chassis housings, and also reduce sliding friction by ensuring sliding contact only along the narrow tops of the ribs. Thus, the dovetail joint provides a tight, secure fit with minimal engagement/disengagement effort.

Figure 7A:
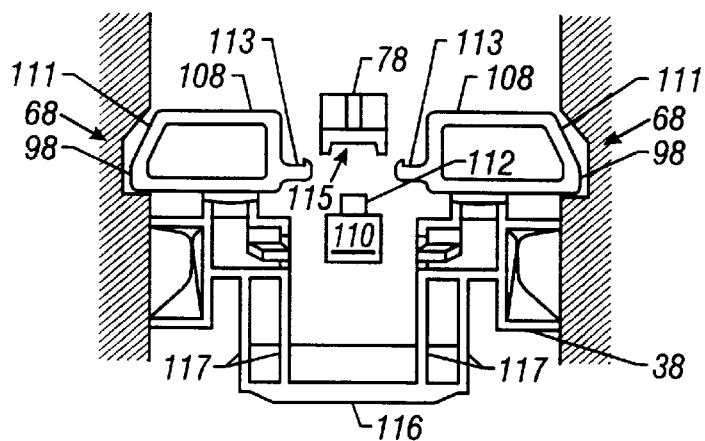
FIGS. 7A and 7B illustrate the latch release allowing and inhibiting, respectively, operation of the trigger switch.
Figure 7B:
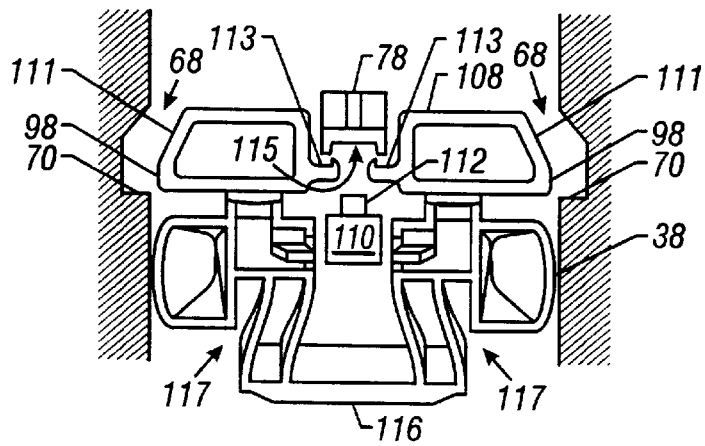

FIGS. 7A and 7B illustrate the interaction of the latch release of the tool and the switch actuator of the battery pack. During battery pack mounting and dismounting (FIG. 7B), the two ears 108 of the latch release come together between actuator 78 and power switch 110 (i.e., into channel 94 of FIG. 6) to prevent the actuator from depressing the plunger 112 at the top of the switch. During assembly of the battery pack to the tool, forward chamfers 111 on pawls 98 help to automatically retract ears 108 as the battery pack is slid to its engaged position, without the user having to depress the latch release buttons. When the battery pack is in its mounted position (as in FIG. 2C), the latching pawls 98 at the outer ends of latch release ears 108 snap into the latch pockets 68 of the battery pack housing (FIG. 7A), with ears 108 sufficiently separated to allow passage of actuator 78. With the trigger pulled, and actuator 78 engaging switch 110, the actuator blocks the inward movement of ears 108 and prevents the user from releasing the latch. If the trigger is inadvertently pulled while the latch is in the position shown in FIG. 7B, hooked protrusions 113 engage a corresponding undercut 115 of actuator 78 to prevent the latch ears from separating and exposing switch 110 until the trigger is released. Switch 110 in the string trimmer embodiment is a non-latching, push-on, release-off switch. For some other tool applications, variable-resistance switches are employed to control variable-speed motors, for example. By locating the switch on the interchangeable tool chassis instead of on the battery pack, various switch types may be employed for different tools, as desired.

Figure 8:
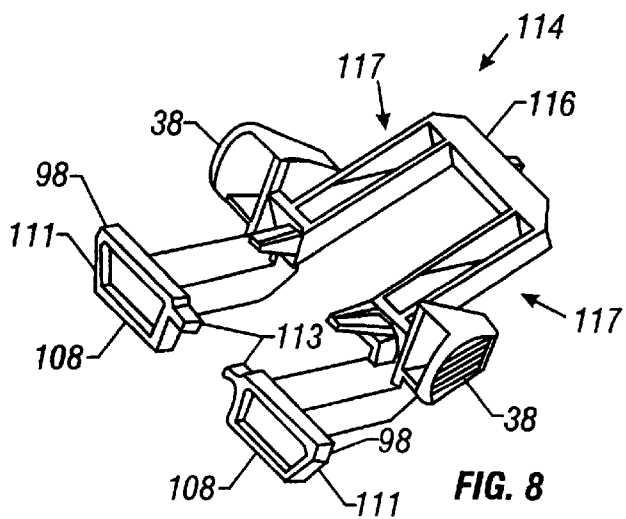
FIG. 8 is a perspective view of a one-piece latch release.

As shown in FIG. 8, latch release 114 is a unitarily molded, plastic member with two pair of parallel beam flexure members 117 extending from a rear cross-member 116 to act as flexure springs to bias ears 108 and buttons 38 of the latch release apart toward an unstressed position. The parallel beam arrangement helps to provide a nearly linear motion of ears 108 and buttons 38 during latch release and engagement. The flexure of members 117 can be seen, for instance, by comparing FIGS. 7A (members straight) and 7B (members flexed).

Figure 9:
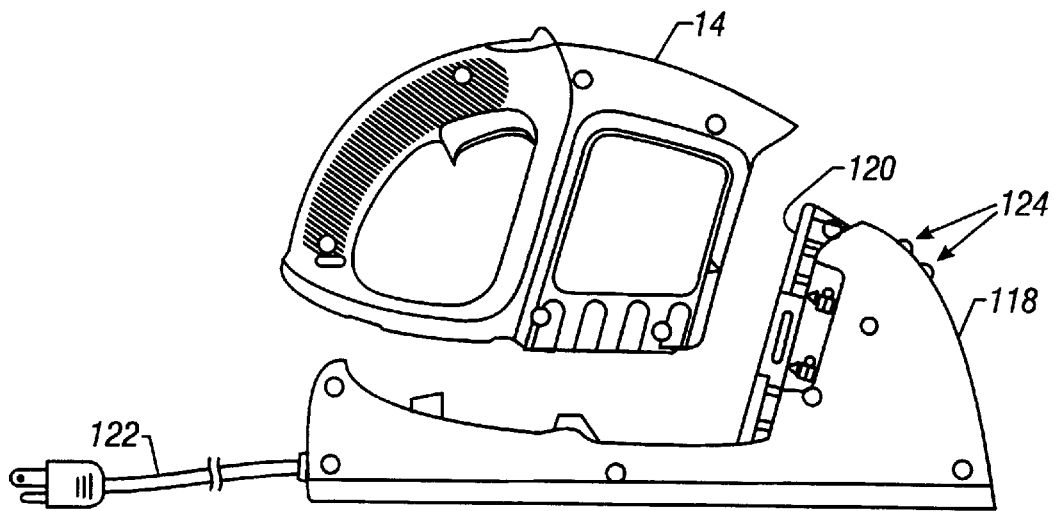
FIG. 9 shows the battery pack being mounted to a recharging station.

FIG. 9 shows a recharging cradle 118 with a mounting face 120 similar to that described above with respect to FIG. 6, but without a latch. When not in use, battery pack 14 is cradled within the charger, engaged against face 120, to recharge its internal battery. Cradle 118 includes appropriate transforming and rectifying circuitry to provide a desired DC voltage for charging directly through the contacts 72 (FIG. 4) of the battery pack. Alternating current (AC) power is received through a standard grounded pigtail 122 from a wall outlet (not shown). Status lights 124 indicate battery pack charging and mounting status. Cradle 118 may be either rested on a table or hung on a vertical wall surface.

Figure 10:
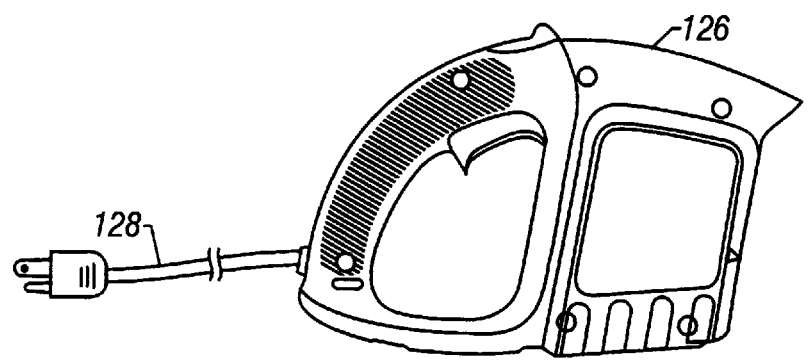
FIG. 10 is a side view of a corded electrical power module.

Referring to FIG. 10, a corded power pack 126 is adapted to power the tools illustrated in FIGS. 3A–3D, but has an electrical cord 128 for accepting AC voltage, instead of a DC storage battery. Its housing contains the necessary power conversion circuitry (not shown) for converting 110 volt AC power to DC power of the desired voltage.

Other embodiments are within the scope of the following claims.

What is claimed is:

1. An interface for releasably connecting a power control module and an electrical appliance, the power control module comprising a power control trigger and being adapted to provide electrical power to a motor of the appliance, the interface defining an interface plane between the appliance and power control module and comprising a flange extending from one of the module and appliance and arranged to be inserted through an aperture in the other of the module and appliance as the module and appliance are moved toward the interface plane in a disengaged position, the other of the module and appliance defining a slot to receive the flange as the module and appliance are subsequently slid across one another along the interface plane to an engaged position;

a latch extending from one of the module and appliance to engage a detent of the other of the module and appliance, to releasably retain the module and appliance in their engaged position; and a first electrical contact attached to one of the module and appliance and arranged to engage a second electrical contact attached to the other of the module and appliance with the module and appliance in their engaged position, to transfer electrical power from the module to the appliance.

2. The interface of claim 1 further comprising an actuator extending from the power control module and operable by the trigger, the actuator arranged to engage an electrical switch mechanism of the appliance to control a flow of electrical current from the power control module to the appliance.

3. The interface of claim 2 wherein the actuator comprises a lever extending from the power control module and adapted to move in a direction along the interface plane to depress the electrical switch mechanism as the trigger is actuated.

4. The interface of claim 2 wherein one of the module and appliance includes a latch release mechanism exposed for manual operation and adapted to release the latch to enable the module and appliance to be moved to their disengaged position.

5. The interface of claim 4 wherein the latch release mechanism is constructed and arranged to physically block operation of the actuator while the latch release mechanism is operated.

6. The interface of claim 4 wherein the actuator is constructed and arranged to physically block operation of the latch release mechanism while the trigger is actuated.

7. The interface of claim 4 constructed and arranged to allow moving the module and appliance to their engaged position without operating the latch release mechanism.

8. The interface of claim 4 wherein the latch release mechanism comprises a pair of depressible buttons disposed on opposite sides of one of the module and appliance.

9. The interface of claim 4 wherein the actuator is constructed to engage and retain the latch release mechanism in a non-latched position when the trigger is pulled while the latch release mechanism is in its non-latched position.

10. The interface of claim 4 wherein the latch and latch release mechanism are components of the appliance.

11. The interface of claim 1 wherein said one of the module and appliance comprises two said flanges extending in opposite directions generally parallel to the interface plane and perpendicular to the slot, said other of the module and appliance defining two said slots, arranged in opposition, for receiving the flanges with the module and appliance in their engaged position.

12. The interface of claim 11 wherein said one of the module and appliance comprising the two flanges further comprises an auxiliary flange spaced apart from, and parallel to, the two flanges; the other of the module and appliance further defining a third slot, of different dimensions than said two slots, for receiving the auxiliary flange as the module and appliance are moved to their engaged position.

13. The interface of claim 1 constructed and arranged to permit the flange to be inserted through the aperture with the module and appliance in only one orientation.

14. The interface of claim 1 wherein the first and second electrical contacts extend along the interface plane such that the contacts slide across one another as the module and appliance are moved toward their engaged position.

15. An interface for releasably connecting a power control module to an electrical appliance, the power control module comprising a power control trigger and adapted to provide electrical power to a motor of the appliance, the interface defining an interface plane between the appliance and power control module and comprising a wide dovetail portion extending from the appliance and arranged to be inserted, through an aperture in the power module, toward the interface plane with the module and appliance in a disengaged position, the power module defining a first slot to receive the wide dovetail portion of the appliance as the power module and appliance are subsequently slid across one another along the interface plane to an engaged position;

an actuator extending from the power control module and operable by the trigger, the actuator arranged to engage an electrical switch mechanism of the appliance to control a flow of electrical current from the power control module to the appliance;

a latch extending from the appliance to engage a detent of the power module, to releasably retain the module and appliance in their engaged position, the latch operable by a latch release mechanism exposed for manual operation on the appliance; and an electrical contact attached to the power module and arranged to engage an electrical contact of the appliance with the module and appliance in their engaged position, to transfer electrical power from the module to the appliance.

16. The interface of claim 15 wherein the power module further defines a second slot, spaced apart from the first slot along the interface plane, the second slot adapted to receive a narrow dovetail portion extending from the appliance, as the module and appliance are slid along the interface plane toward their engaged position.

17. The interface of claim 16 wherein the wide dovetail portion is between about 75 and 85 millimeters in width, as measured across the interface plane, and the narrow dovetail portion is between about 55 and 65 millimeters in width, as measured across the interface plane.

18. An interface for releasably connecting a power control module and an electrical appliance, the power control module comprising a power control trigger and adapted to provide electrical power to a motor of the appliance, the interface defining an interface plane between the appliance and power control module and comprising flanges on each of the power control module and appliance, the flanges arranged to overlap as the power module is slid along the interface plane, to an engaged position on the appliance;

a latch pawl extending from the appliance to engage a detent of the power control module, to releasably retain the module in its engaged position;

electrical contacts on each of the power control module and appliance, the contacts arranged for electrical engagement when the module is in the engaged position, to transfer electrical power from the module to the appliance;

an actuator extending from the power control module to activate an electrical switch of the appliance when a trigger of the power control module is actuated; and a latch release mechanism exposed for manual operation to retract the latch pawl and physically block activation of the electrical switch by the actuator during power control module installation and removal.

19. The interface of claim 18 wherein the actuator is constructed and arranged to physically block operation of the latch release mechanism while the trigger is actuated.

20. The interface of claim 18 wherein the latch release mechanism comprises a pair of depressible buttons disposed on opposite sides of the appliance and connected by a resilient member.

21. The interface of claim 18 wherein the actuator comprises a lever extending from the power control module and adapted to move in a direction along the interface plane to depress the electrical switch mechanism as the trigger is actuated.

22. A power control module for providing power to a portable electrical appliance, the control module comprising a housing having a mounting face configured for releasable attachment to a corresponding face of the electrical appliance, the mounting face defining an aperture therein for receiving a flange of the appliance face as the housing and appliance faces are moved toward one another in a disengaged position, and a slot contiguous with and extending from the aperture along the mounting face, for receiving the flange of the appliance face as the housing and appliance faces are slid across one another to an engaged position;

an electrical contact extending from the housing and exposed to engage a mating contact of the appliance as the housing and appliance are moved to their engaged position, the contact adapted to transfer electrical power from the power control module to the appliance; and a trigger movably attached to the housing and exposed to be manipulated by an operator to control the appliance.

23. The power control module of claim 22 wherein the trigger is operably connected to an actuator extending from the mounting face of the housing to engage an associated electrical switch mechanism of the appliance.

24. The power control module of claim 22 wherein the housing further defines a graspable handle.

25. The power control module of claim 22 further comprising a battery contained within the housing and electrically connected to the electrical contact.

26. The power control module of claim 22 adapted to receive electrical power from an external power source while attached to the appliance.

27. The power control module of claim 26 comprising an electrical cord for plugging the module into an AC electrical outlet.

28. The power control module of claim 26 comprising an external contact for connection to an external DC power source.

29. A portable electrical appliance configured to accept the power control module of claim 18 in releasable attachment thereto.

30. A portable electrical power tool comprising an appliance having an electrical motor arranged to do useful work, and a housing with a mounting face having an extending flange and an electrical contact for receiving electrical power; and a removable power module comprising a housing having a mounting face configured for releasable attachment to the mounting face of the appliance housing, the mounting face of the power module housing defining an aperture therein for receiving the flange of the appliance mounting face as the mounting faces are moved toward one another in a disengaged position, and a slot contiguous with and extending from the aperture along the power module mounting face, for receiving the flange of the appliance mounting face as the mounting faces are slid across one another to an engaged position;

an electrical contact extending from the power module housing and exposed to engage the contact of the appliance as the power module is moved to its engaged position, the contact adapted to transfer electrical power from the power control module to the appliance; and a trigger movably attached to the power module housing and exposed to be manipulated by an operator to control the appliance.

31. The portable electrical power tool of claim 30 wherein the removable power module comprises a battery pack and contains at least one electrical storage battery.

32. The portable electrical power tool of claim 31 wherein the battery is adapted to be recharged through the electrical contact extending from the power module housing.

33. The portable electrical power tool of claim 31 wherein the battery is adapted to be recharged within the battery pack while the battery pack is installed on the appliance.

34. The portable electrical power tool of claim 30 comprising an outdoor home gardening tool.

35. A portable electrical appliance adapted to be powered by a removable power module, the appliance including an electrical motor arranged to do useful work, the appliance having a power module mounting face with two sets of outwardly extending flanges and an electrical contact for receiving electrical power from the power module for driving the motor, the two sets of flanges being spaced apart, in a direction parallel to the slots, for receiving a mating set of flanges of the power module therebetween in a first assembly motion the two sets of flanges overhanging associated slots adapted to receive mating flanges of the power module during a second assembly motion, generally perpendicular to the first assembly motion, to retain the power module on the appliance.

36. The appliance of claim 35 wherein one set of flanges extends over a greater width, measured in a direction perpendicular to the slots, than the other set of flanges.

37. The appliance of claim 36 wherein said one set of flanges extends over a width of about 82 millimeters.

38. The appliance of claim 35 further comprising a latch extending outwardly into one of the overhung slots and adapted to engage a detent of the power module to releasably retain the module and appliance in an engaged position.

39. A method of releasably installing a removable power control module on an electrical appliance, the method comprising providing an appliance having
an electrical motor arranged to do useful work;
a housing with a mounting face having an extending flange, an operable latch, and an electrical contact for receiving electrical power;
an electrical switch electrically coupling the contact and the motor; and
a latch release mechanism constructed to, when actuated, both operate the latch and inhibit operation of the switch;

providing a removable power module comprising
a housing having a mounting face configured for releasable attachment to the mounting face of the appliance housing, the mounting face of the power module housing defining both an aperture and a slot contiguous with and extending from the aperture along the power module mounting face;
an electrical contact extending from the power module housing and exposed to engage the contact of the appliance housing to transfer electrical power from the power control module to the appliance motor; and
a trigger movably attached to the power module housing and exposed to be manipulated by an operator to control the appliance;

bringing the mounting faces of the appliance and power module together in face-to-face relation in a disengaged position, while inserting the flange of the appliance housing into the aperture of the power module housing mounting face; and sliding the power module and appliance mounting faces across one another in a predetermined direction to an engaged position, the flange of the power module mounting face being received within the slot of the appliance housing mounting face and the electrical contact of the power module engaging the contact of the appliance housing.

* * * * *